United States Patent [19]

Mier

[11] Patent Number: 5,047,282
[45] Date of Patent: Sep. 10, 1991

[54] TRANSLUCENT AND VARIEGATED DECORATIVE LAMINATE HAVING AN EFFECT OF DEPTH

[75] Inventor: Jesus L. Mier, Las Arenas, Spain

[73] Assignee: Formica Corporation, Wayne, N.J.

[21] Appl. No.: 120,975

[22] Filed: Nov. 16, 1987

[30] Foreign Application Priority Data

Nov. 18, 1986 [ES] Spain .................................. 8603067

[51] Int. Cl.⁵ ........................ B32B 21/08; B32B 27/04
[52] U.S. Cl. .................................... 428/204; 428/38;
428/205; 428/530; 428/531; 428/542.2;
428/537.5; 428/918; 156/307.4; 156/275.5
[58] Field of Search ............... 428/204, 205, 38, 530, 428/531, 542.2, 537.5, 918

[56] References Cited

U.S. PATENT DOCUMENTS

| | | | |
|---|---|---|---|
| 3,785,911 | 1/1974 | Ungar et al. | 161/5 |
| 3,958,053 | 5/1976 | Ryan | 428/318.8 |
| 4,801,495 | 1/1989 | van der Hoeven | 428/542.2 |

FOREIGN PATENT DOCUMENTS

| | | |
|---|---|---|
| 0013267 | 7/1980 | European Pat. Off. . |
| 7923586 | 9/1979 | France . |
| 0199652 | 12/1982 | Japan .................... 428/918 |
| 1136650 | 12/1968 | United Kingdom . |
| GB2035204A | 9/1979 | United Kingdom . |

OTHER PUBLICATIONS

"Modern Plastics Magazine", Oct. 1939 issue, pp. 425-428 Titled: Translucent Laminates by Henry E. Stockfish.

Primary Examiner—P. C. Sluby
Attorney, Agent, or Firm—Neuman, Williams, Anderson & Olson

[57] ABSTRACT

A translucent and variegated resin impregnated decorative paper laminate having the visual three-dimensional effect of depth and to a method of manufacturing the same which comprises laminating a plurality of highly absorbent, transparent paper sheets impregnated with a resin under heat and pressure sufficient to form a unified and stratified laminate.

11 Claims, 1 Drawing Sheet

TRANSLUCENT AND VARIEGATED DECORATIVE LAMINATE HAVING AN EFFECT OF DEPTH

FIELD OF INVENTION

The present invention relates to a translucent and variegated resin impregnated decorative paper laminate having the visual effect of depth and to a method of manufacturing the same which comprises laminating a plurality of highly absorbent, transparent paper sheets impregnated with a resin under heat and pressure sufficient to form a unified and stratified laminate.

BACKGROUND OF THE INVENTION

The production of high pressure, decorative laminates from resin impregnated paper sheets is well known in the art. These decorative laminates are generally constructed with a core layer, a decorative layer and an overlay or surface layer. These layers are then heat and pressure consolidated into the decorative laminate.

These commonly known decorative laminates have a variety of uses such as for wall coverings, countertops, furniture and the like. However, while these commonly known decorative laminates have achieved satisfactory use, they are not altogether desirable. Because of the one dimensional design contained within these laminates, these laminates have limited decorative use. Thus, there exists a need for a laminate having a design with a dimensional effect of depth while also being durable enough to be used on surfaces such as counter and table tops, and versatile enough to be able to be manufactured in a wide variety of thicknesses and patterns to satisfy any decorative purpose.

SUMMARY OF THE INVENTION

It is an object of the present invention to provide a decorative and functional laminate. More specifically, it is an object of the present invention to provide a decorative laminate which has a design which gives a visual three-dimensional effect of depth, particularly to achieve the appearance of decorative stones such as alabaster or marble.

It is another object of the present invention to provide a decorative laminate which can be produced in a variety of thicknesses.

It is still another object of the present invention to provide a decorative laminate which can be produced in a variety of visual three-dimensional effects or designs.

It is still another object of the present invention to provide a decorative laminate which is translucent.

It is yet another object of the present invention to provide a decorative laminate which may have one or more finished sides.

It is an even further object of the present invention to provide a decorative laminate which is durable enough to be bent, cut or machined and still maintain its dimensional design quality.

It is still a further object of the present invention to provide a method for manufacturing the decorative laminate.

These and other objects of the invention will be apparent hereinafter from the specification which describes the best mode of practicing the invention and a preferred embodiment. Reference should also be made to the drawings, which constitute a part of the disclosure, and the subject matter claimed.

Generally, the aforementioned objects of invention are achieved by the present invention which relates to a translucent and variegated decorative laminate which produces the visual three dimensional impression of depth comprising (1) a core comprising a plurality of translucent resin impregnated paper sheets; (2) two or more resin impregnated paper decorative sheets with printed variegation or translucent color and printed variegation to obtain the desired decorative effect; (3) at least two or more resin impregnated translucent intermediate sheets inserted between said decorative sheets and (4) a high resin content resin impregnated translucent surface sheet.

The present invention is also directed to a method of producing a translucent, variegated decorative laminate having the visual effect of depth, which comprises forming a laminate assembly of, in superimposed relationship, a plurality of resin impregnated core sheets, two or more resin impregnated decorative sheets printed on one side with a color or variation required to obtain the desired decorative effect, at least two or more resin impregnated intermediate sheets inserted between the decorative sheets, and a resin impregnated surface sheet having a high resin content, wherein the resin may be a translucent melamine resin, a translucent polyester resin or the like with the relevant volatile content, and heat and pressure consolidating the resultant assembly. The resins employed to impregnate the sheets of the laminate, the amounts of resin used to impregnate the sheets, the nature of the paper sheets used in the laminate and the methods of making the laminate are set forth in the following.

Any transparent or translucent melamine or polyester resin or like resin such as epoxy resin, having the relevant volatile content may be used to impregnate the core, decorative, intermediate or surface sheets used to produce the novel articles of the present invention. The melamine resins used to impregnate the paper sheets to form the laminates include melamine resins which are transparent or translucent in the cured state. These are preferably thermosetting resins such as melamine-formaldehyde resins, copolymers of melamine, aqueous amines and formaldehyde, and acrylic modified melamine formaldehyde resins. Polyester resins are generally well known in the art and are normally unsaturated polyesters produced from such acids and anhydrides as isophtalic anhydride, oleic acid, adipic acid, maleic anhydride, and the like, and polyhydroxy alcohols such as ethylene glycol, propylene glycol, 1,3-propanediol, 1,2-butanediol, 1,4-butanediol, glycerol, pinacol, 1,2-cyclopentanediol and the like. Additionally, such monomers as styrene, vinyl toluene, diallyl phthalate, vinyl acetate, methyl methacrylate and the like may be used as cross linking agents in conjunction with the alcohols and acids or anhydrides mentioned above.

The laminate of the present invention is composed of sheets of highly transparent, absorbent paper which have a high mechanical resistance. The surface sheets in particular have high mechanical resistance capable of resisting staining, wear, water absorption and the like, thus making the laminate durable and longlasting.

The laminate core is comprised of a variable number of sheets of highly transparent, special absorbent paper which may be colored or tinted of about 80 to 100 grs/sqm. (grams per square meter), impregnated with a melamine resin, polyester resin or other like resin to the extent of about 44–56% of the weight of the treated sheet when partially dried and partially cured prior to assembly. The partially dried impregnated core sheets have a volatile content ranging from about 5–9%. These volatiles include water, unreacted monomers and solvent. The volatiles are partially driven off and partially reacted during the lamination step of heat and pressure. The core sheets are thus partially dried and cured prior to the construction of the laminate. The core layer of the decorative laminate is usually made up of a plurality of paper sheets. The desired thickness of the decorative laminate will determine the number of core sheets used, having in mind the desired translucency of the laminate.

The decorative sheets used in the laminate are sheets of special absorbent paper, which may be uncolored, or colored or tinted, of about 80 to 100 grs/sqm. printed on one side with variegation pattern or design required in each particular case for the decorative effect desired. In the case of a simulated marble or alabaster, the pattern printed (which can be in colored inks), represents for example the striations or interior patterns of natural stone. The decorative sheets are impregnated with a melamine resin, polyester resin or like resin to the extent of about 44–56% of the resulting weight of the treated paper when partially dried and partially cured prior to assembly. The partially dried impregnated sheets have a volatile content ranging from about 5–9%. The decorative sheets are then partially dried and partially cured prior to the assembly of and into the laminate. The number of decorative sheets used in the laminate may vary depending upon the decorative effect desired. The greater number of decorative sheets used in the laminate, the greater effect of depth the laminate will have owing to the position on different planes of the designs printed on the decorative sheets.

Intermediate sheets of highly transparent, optionally colored or tinted, special absorbent paper are inserted under the surface sheets of the laminate and between each decorative sheet used in the laminate. The intermediate sheets are special absorbent paper of about 80 to 100 grs/sqm. and are impregnated with a translucent melamine resin, polyester resin or a like resin to the extent of about 44–56% of the weight of the treated sheet when partially dried and partially cured prior to assembly. The partially dried and partially cured impregnated intermediate sheets have, as noted, a volatile content ranging from about 5–9%. The intermediate sheets are then partially dried and partially cured to assembly into the laminate. At least two intermediate sheets should be placed between each decorative sheet, however, any number of intermediate sheets may be utilized to produce the desired decorative effect.

The surface sheets utilized in the laminate are made of a highly transparent, special absorbent paper of 20 to 40 grs/sqm. impregnated with a melamine resin, polyester resin or a similar type resin, to the extent of about 60–80% of the weight of the impregnated paper when partially dried and partially cured prior to assembly. The partially dried impregnated surface sheets have a volatile content ranging from about 4–8%. The surface sheets are similarly partially dried and partially cured prior to assembly into the laminate. The surface sheets are particularly well adapted for resistance to staining, wear, water absorption and the like.

Any translucent melamine resin, polyester resin, or like resin known to be useful for the production of decorative laminates of which melamine and polyester types are discussed above, may be used to impregnate the sheets used to construct the laminate assembly of the present invention. The resin is impregnated into the core, intermediate and decor sheets in an aggregate amount ranging from about 44% to about 80%, by weight, based on the weight of the impregnated sheet, and the surface sheets impregnates at levels 60 to 80% by weight (total).

The decorative laminate of the present invention may have a variety of thicknesses depending upon the design effect desired and the use of the laminate. The thickness of the decorative laminate can be increased by simply increasing the number of core sheets, design sheets and or intermediate sheets used. The laminate may also have a variety of design effects by simply increasing the number of decorative and intermediate sheets used in the laminate assembly.

The decorative laminate of the present invention may also be constructed as a one-sided assembly for use on walls, countertops or furniture tops, or may be constructed as a two-sided assembly for use in furniture or decorative objects.

The novel decorative articles of the present invention are translucent and give the impression of depth as a result of the incorporation of decorative sheets with variegated designs at different levels within the laminate. The laminate can be finished on one or both sides and is resilient enough so it can be cut, bent or machined without marring its decorative quality.

BRIEF DESCRIPTION OF THE DRAWINGS

For a more complete understanding of this invention, reference should be made to the drawings, as briefly described below.

DETAILED DESCRIPTION OF THE PREFERRED EMBODIMENT

Figure 1:
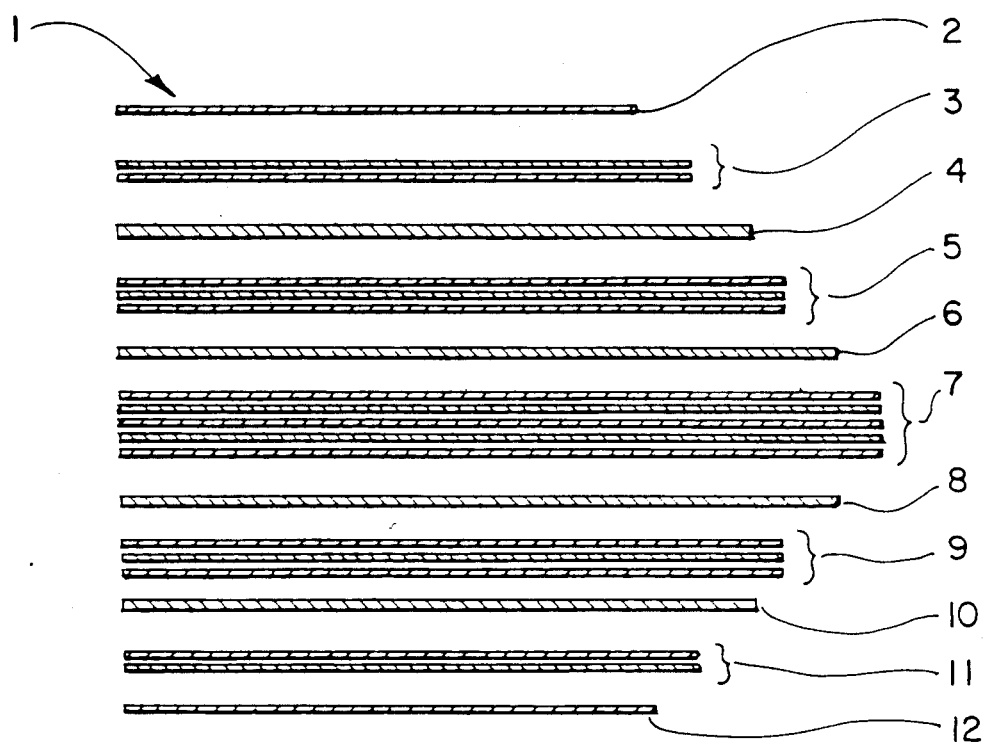
FIG. 1 is a cross-section of the decorative laminate showing, in a separate manner, each sheet or group of sheets which comprises the laminate assembly.

Referring to FIG. 1, a typical assembly of the decorative laminate 1 is illustrated. The laminate core 7 is comprised of a variable number of highly transparent special absorbent paper sheets of about 80 to 100 grs/sqm. (grams per square meter) which have been impregnated with a melamine, polyester or like resin, the resin content accounting for about 44–56% of the weight of the treated core sheet when partially dried and partially cured prior to assembly. The partially dried and partially cured impregnated core sheets have a volatile content ranging from 5–9%. These core sheets 7 are partially dried and cured after impregnation with the resin and prior to being placed in the laminate assembly.

On each side of the laminate core 7 a decorative sheet 6, 8 is placed. The decorative sheets 6 and 8 are special absorbent paper of about 80 to 100 grs/sqm. and are printed on one side with the color and variegation which may be required in each particular case for decorative purposes. Decorative sheets 6 and 8 are impregnated with a melamine, polyester or like resin, the resin content accounting for about 44–56% of the weight of the treated sheet when partially dried and partially cured. The partially dried and partially cured impregnated decorative sheets 6, 8 have a volatile content ranging from about 5-9%. The decorative sheets 6, 8 are then partially dried and cured after impregnation with the resin and prior to being placed in the laminate assembly.

Three intermediate sheets 5 are layered on top of decorative sheet 6 and three intermediate sheets 9 are layered on top of decorative sheet 8. These intermediate sheets 5, 9 are highly transparent, special absorbent paper of about 80 to 100 grs/sqm. and are impregnated with a melamine resin, polyester resin or like resin, with the resin content corresponding to about 44-56% of the weight of the treated intermediate sheet 5, 9 when partially dried and cured. These partially dried and partially cured impregnated intermediate sheets 5, 9 have a volatile content ranging from about 5-9%. Intermediate sheets 5 and 9 are partially dried and cured after impregnation with the resin and prior to being placed in the laminate assembly.

Additional decorative sheets 4, 10 are layered over intermediate sheets 5 and 9 respectively. Decorative sheets 4 and 10 have the identical characteristics as decorative sheets 6 and 8 and are also impregnated with a melamine resin, polyester resin or like resin, to the extent that about 44-56% of the resulting weight of the resin impregnated decorative sheets 4, 10 corresponds to the resin content after being partially dried and partially cured. These partially dried and partially cured decorative sheets 4, 10 additionally have a volatile content ranging from about 5-9%. Decorative sheets 4, 10 are also partially dried and cured after impregnation with the resin and prior to being placed in the laminate assembly.

Two additional intermediate sheets 3 are then layered over decorative sheet 4 and two intermediate sheets 11 are highly transparent, layered over decorative sheet 10. These intermediate sheets 3, 11 are special absorbent paper of about 80 to 100 grs/sqm. and are impregnated with a melamine resin, polyester resin or like resin, to the extent that about 44-56% of the weight of the resin impregnated intermediate sheets 3 and 11 corresponds to the resin content after being partially dried and cured. These partially dried and partially cured intermediate sheets 3, 11 have a volatile content ranging from about 5-9%. The intermediate sheets 3 and 11 are also partially dried and cured after impregnation with the resin and prior to being placed in the laminate assembly.

Finally, a surface sheet 2 is placed over intermediate sheets 3 and surface sheet 12 is placed over intermediate sheets 11. Surface sheets 2 and 12 are highly transparent, special absorbent paper of about 20 to 40 grs/sqm. Surface sheets 2, 12 are impregnated with a melamine resin, polyester resin, or like resin to the extent that about 60-80% of the weight of the resin treated surface sheets 2, 12 corresponds to the resin content after being partially dried and partially cured. These partially dried and cured surface sheets also have a volatile content ranging from about 4-8%. Surface sheets 2, 12 are also partially dried and partially cured after being impregnated with the resin and prior to being placed in the laminate assembly.

Figure 2:
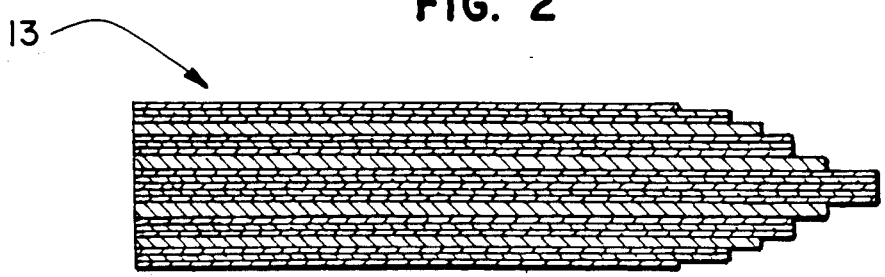
FIG. 2 is a cross-section of the laminate showing the laminate as a whole after assembly and after the assembly has been subjected to temperature and pressure adequate for lamination to occur.

Once the sheets are arranged in the order as illustrated in FIG. 1, the laminate assembly is placed between two steel plates in a high pressure press and subjected to a 25 to 30 minute heating cycle at a temperature of about 135° C. to 155° C. This high pressure and heating results in a translucent and variegated decorative laminate 13 having an effect of depth (FIG. 2).

From the description thus far provided, it is apparent that a variety of modifications to the laminate assembly may be made by those having the benefit of the foregoing teachings, without departing from the spirit and scope of the disclosed principles. Accordingly, while the invention disclosed herein has been described with reference to an illustrative preferred embodiment for practicing the invention, the present invention is not to be construed as being solely limited to such illustrative embodiment.

What is claimed is:

1. A translucent and variegated decorative laminate having a visual three dimensional effect of depth, wherein said laminate comprises (1) a core of a plurality of translucent resin impregnated absorbent and transparent paper sheets, (2) two or more translucent resin impregnated decorative sheets with printed variegation therein to obtain the desired decorative effect, (3) at least two or more translucent resin impregnated translucent intermediate sheets inserted between said decorative sheets, and (4) a translucent resin impregnated surface sheet.

2. A translucent and variegated decorative laminate having a visual three dimensional effect of depth as set forth in claim 1, wherein said sheets are impregnated with resin and are partially dried and cured prior to assembly into the laminate.

3. A translucent and variegated decorative laminate having a visual three dimensional effect of depth as set forth in claim 1, wherein said resin is a translucent or transparent thermosetting resin suitable for use in decorative laminates.

4. A translucent and variegated decorative laminate having a visual three dimensional effect of depth as set forth in claim 1, wherein said resin is a transparent melamine resin.

5. A translucent and variegated decorative laminate having a visual three dimensional effect of depth as set forth in claim 1, wherein said resin is a transparent polyester resin.

6. A translucent and variegated decorative laminate having a visual three dimensional effect of depth as set forth in claim 1, wherein said laminate consists of a core made of a variable number of said sheets having a basis weight of about 80 to 100 grams per square meter, the number of said sheets dependant upon the predetermined thickness of said laminate, wherein said core sheets are impregnated with a thermosetting resin in an amount of from about 44% to 56% by weight thereof, said resin having a volatile content sufficient to allow said core sheets to have a volatile content ranging from about 5-9% when said core sheets are partially dried.

7. A translucent and variegated decorative laminate having a visual three dimensional effect of depth as set forth in claim 1, said laminate further comprising two or more decorative sheets having a basis weight of about 80 to 100 grams per square meter and a printed design thereon or variegation or of translucent color having a printed design or variegation thereon, placed on each side of said core, wherein said decorative sheets are impregnated with a transparent thermosetting resin in an amount of from about 44% to 56% by weight thereof, said resin having a volatile content sufficient to allow said decorative sheets to have a volatile content ranging from about 5-9% when said decorative sheets are partially dried.

8. A translucent and variegated decorative laminate having a visual three dimensional effect of depth as set forth in claim 1, said laminate further comprising groups of two or more intermediate sheets having a basis weight of about 80 to 100 grams per square meter inserted between said decorative sheets, wherein said intermediate sheets are impregnated with a thermosetting resin in an amount of from 44% to 56% by weight thereof, said resin having a volatile content sufficient to allow said intermediate sheets to have a volatile content ranging from about 5-9% when said intermediate sheets are partially dried.

9. A translucent and variegated decorative laminate having a visual three-dimensional effect of depth as set forth in claim 8, wherein said intermediate sheets are colored or tinted.

10. A translucent and variegated decorative laminate having a three-dimensional effect of depth as set forth in claim 1, said laminate further comprising at least one surface sheet having a basis weight of about 20 to 40 grams per square meter placed on said intermediate sheets, said surface sheet having high mechanical resistance as required for a surfacing material, and wherein said surface sheet is impregnated with a transparent thermosetting resin selected from the groups of melamine and polyester resins, in an amount of from about 60% to 80% of the total weight of said impregnated sheet, said resin having a volatile content sufficient to allow said surface sheets to have a volatile content ranging from about 4-8% when said surface sheets are partially dried.

11. A translucent and variegated decorative laminate assembly of partially dried absorbent translucent paper sheets impregnated with melamine or polyester resins which are translucent in the cured state, said assembly comprising
 (1) a core of one or more impregnated sheets,
 (2) a two or more resin impregnated decor sheet with printed variegations therein,
 (3) two or more translucent impregnated intermediate sheets between the decor sheets and
 (4) a translucent resin impregnated surface sheet.

* * * * *